United States Patent
Jung et al.

(10) Patent No.: US 7,830,840 B2
(45) Date of Patent: Nov. 9, 2010

(54) APPARATUS AND METHOD FOR IMPLEMENTING SDMA IN MULTI-USER MULTI-ANTENNA SYSTEM

(75) Inventors: Young-Ho Jung, Suwon-si (KR); Cheol-Woo You, Seoul (KR); Dong-Ho Kim, Seoul (KR); Yong-Up Jang, Changwon-si (KR); Jin-Gon Joung, Seoul (KR); Yong-Hoon Lee, Daejeon (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 747 days.

(21) Appl. No.: 11/789,713

(22) Filed: Apr. 25, 2007

(65) Prior Publication Data

US 2007/0259694 A1 Nov. 8, 2007

(30) Foreign Application Priority Data

Apr. 25, 2006 (KR) ...................... 10-2006-0037157

(51) Int. Cl.
 *H04J 3/00* (2006.01)
(52) U.S. Cl. ........................ 370/337; 370/334; 370/328; 455/562.1

(58) Field of Classification Search .................. 455/562, 455/550.1, 575.7, 562.1; 370/210, 337, 334, 370/328
See application file for complete search history.

(56) References Cited

U.S. PATENT DOCUMENTS

2004/0002364 A1* 1/2004 Trikkonen et al. ....... 455/562.1
2004/0252632 A1* 12/2004 Bourdoux et al. ........... 370/210

OTHER PUBLICATIONS

Shen et al., Low Complexity User Selection Algorithms for Multiuser MIMO Systems with Block Diagonalization, Sep. 10, 2005.
Fuchs et al., A Novel Tree-Based Scheduling Algorithm for the Downlink of Multi-User MIMO Systems with ZF Beamforming, 2005.

* cited by examiner

*Primary Examiner*—Danh C Le
(74) *Attorney, Agent, or Firm*—The Farrell Law Firm, LLP

(57) ABSTRACT

An apparatus and method for implementing SDMA in a multi-user multi-antenna system are provided, in which SDMA users are selected from among total users according to channel state information of the total users, and the number of transmission streams to be allocated to each of the SDMA users is determined by a tree search method.

24 Claims, 10 Drawing Sheets

existing code here …

APPARATUS AND METHOD FOR IMPLEMENTING SDMA IN MULTI-USER MULTI-ANTENNA SYSTEM

PRIORITY

This application claims priority under 35 U.S.C. §119 to an application filed in the Korean Intellectual Property Office on Apr. 25, 2006 entitled "Apparatus and Method for Implementing SDMA Multi-User Multi-Antenna System" and assigned Serial No. 2006-37157, the contents of which are incorporated herein by reference.

BACKGROUND OF THE INVENTION

1. Field of the Invention

The present invention relates generally to a multi-antenna system, and in particular, to an apparatus and method for selecting users and the number of transmission streams for them in order to realize Spatial Division Multiple Access (SDMA) with the aim to increase capacity in a multi-user multi-antenna system.

2. Description of the Related Art

Along with the recent rapid increase in the use of multimedia service, demands for high-speed transmission of large amount of data on radio channels have been increasing. Accordingly, studies have been made on transmission of a large amount of data on mobile channels and radio channels. One of the studies is focusing on a multi-antenna system such as a Multiple-Input Multiple-Output (MIMO) scheme.

A MIMO system uses multiple antennas at both the transmitter and receiver. Compared to a single-antenna system, the MIMO system can increase transmission capacity without using additional frequency or increasing transmission power. It also services multiple users.

The multi-user MIMO system can maximize capacity by Dirty Paper Coding (DPC). Due to its implementation complexity, however, DPC makes it difficult to implement in the MIMO system. That's why the MIMO system adopts SDMA that increases capacity by allowing a plurality of users simultaneously access in time and frequency.

Implementation of SDMA can be considered in two ways. One is to select SDMA users according to the capacities of multiple users for a given number of transmission streams per SDMA user and the other is to determine the number of transmission streams for each of given SDMA users.

In the former case, because the number of transmission streams per user is fixed, the diversity effect resulting from selecting transmission streams for each user is not achieved. In the latter case, because SDMA user groups are fixed, multi-user diversity is not achieved.

To avoid the above problem encountered with the MIMO-SDMA system, the MIMO system can implement SDMA by selecting SDMA users and determining the number of transmission streams for each of the SDMA users simultaneously.

To do so, the MIMO system compares the performance metrics of all possible user combinations with those of all possible stream combinations available to the user combinations. As a consequence, system complexity exponentially increases with the number of total users and the number of available streams.

SUMMARY OF THE INVENTION

An object of the present invention is to solve at least the above problems and/or disadvantages and to provide at least the advantages below. Accordingly, an object of the present invention is to provide an apparatus and method for implementing SDMA to increase capacity or performance in a multi-user multi-antenna system.

Another object of the present invention is to provide an apparatus and method for selecting users and determining the number of streams for allocation to each of the users to realize SDMA in a multi-user multi-antenna system.

A further object of the present invention is to provide an apparatus and method for reducing the complexity involved in selecting users and determining the number of streams for allocation to each of the users to realize SDMA in a multi-user multi-antenna system.

According to one aspect of the present invention, there is provided a method for implementing SDMA in a multi-user multi-antenna system, in which SDMA users are selected from among total users according to channel state information of the total users, and the number of transmission streams to be allocated to each of the SDMA users is determined by a tree search method.

According to another aspect of the present invention, there is provided a transmitter in a multi-user multi-antenna system, in which a user selector selects SDMA users from among total users according to channel state information of the total users, and a stream decider determines the number of transmission streams to be allocated to each of the SDMA users by a tree search method.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a technique for selecting SDMA users and determining the number of transmission streams for allocation to each of the SDMA users in order to implement SDMA with the aim to increase capacity in a multi-user multi-antenna system.

The following description is made in the context of a MIMO system with the appreciation that the present invention is also applicable to other multi-antenna systems. Herein below, it is assumed that all users use the same number of receive antennas.

Figure 1:
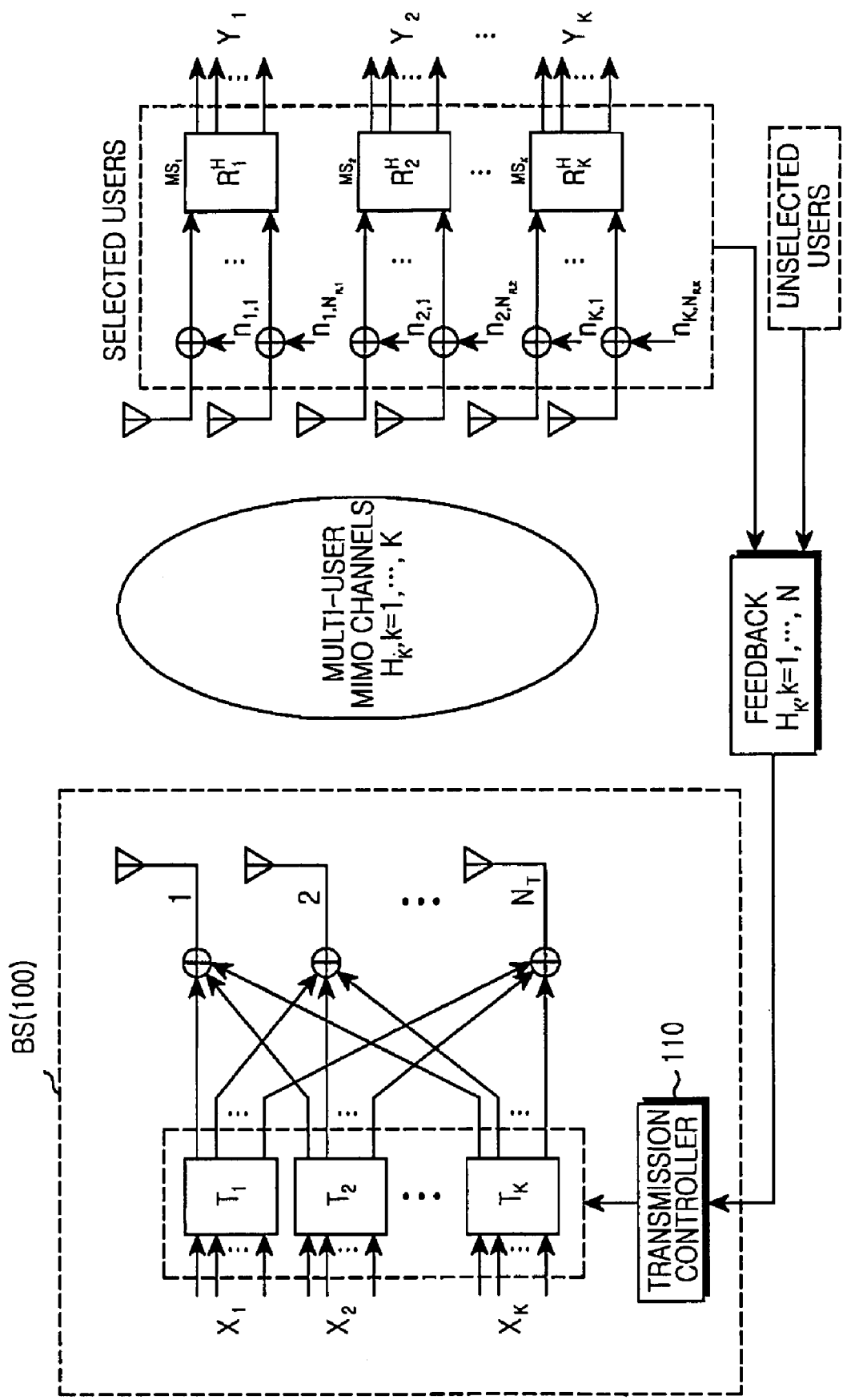
FIG. 1 is a block diagram of a multi-user multi-antenna system according to the present invention.

In the illustrated case of FIG. 1, K users each have $N_{R,K}$ receive antennas and communicate with a Base Station (BS) 100 with $N_T$ transmit antennas in SDMA.

Referring to FIG. 1, BS 100 selects K users from among N total users and communicates with the K users. More precisely, BS 100 selects K SDMA users and determines the number of transmission streams for allocation to each of the K SDMA users through a transmission controller 110 according to downlink channel information about the total N users. Notably, transmission controller 110 can receive the downlink channel information from the N users. If the MIMO system operates in Time Division Duplex (TDD), transmission controller 110 may estimate downlink channels using uplink channel signals received from the users.

BS 100 calculates SDMA weight values for the K SDMA users based on their downlink channel information (i.e. MIMO channel information) by Equation (1):

$$W_m = N(H_{\overline{m}}) \in C^{N_T \times (N_T - \sum_{i=1, j \neq m}^{K} 0 L_m)}, m \in \{1, 2, \ldots, K\} \quad (1)$$

where $W_m$ denotes an SDMA weight value for an $m^{th}$ SDMA user, K denotes the number of the SDMA users, $N_T$ denotes the number of the transmit antennas of BS 100, $L_m$ denotes the number of transmission streams to be allocated to the $m^{th}$ SDMA user, N(A) denotes a function for rendering matrix A null space, and $H_{\overline{m}}$ denotes a whole channel matrix except for the MIMO channel of the $m^{th}$ SDMA user, expressed as Equation (2):

$$H_{\overline{m}} = [H_1^H U_1(1:L_1), \ldots, H_{m-1}^H U_{m-1}(1:L_{m-1}), H_{m+1}^H U_{m+1}(1:L_{m+1}), \ldots, H_K^H U_K(1:L_K)]^H \quad (2)$$

where $U_m$ denotes the left Singular Value Deposition (SVD) matrix of the MIMO channel $H_m$ of the $m^{th}$ SDMA user, when the MIMO channel $H_m$ is decomposed by SVD, and U(1: L) denotes a submatrix of matrix U, formed by $1^{st}$ to $L^{th}$ columns of matrix U. The downlink channel information, i.e. the MIMO channel information of the K SDMA users is denoted by $H_1, \ldots, H_K$ and each MIMO channel is an $N_{R,K} \times N_T$ complex matrix.

BS 100 applies the SDMA weight values to data to be sent to the SDMA users. Then BS 100 generates SVD weight values for the SDMA users and applies them to the data (pre-processing). Eventually, BS 100 sends the data weighted with the SDMA weight values and the SVD weight values to the SDMA users.

Because each of the K SDMA users receives a signal free of signals for the other SDMA users from BS 100, it can recover the data using its SVD weight value (post processing) by Equation (4). In other words, BS 100 sends to the SDMA users the data in which interference between users is cancelled by the SDMA weight values given as Equation (1). The SDMA weight values have the following property as shown in Equation (3):

$$U_n^H(1:L_n)H_nW_m=0, (n \neq m)$$

$$U_n^H(1:L_n)H_nW_m \neq 0, (n=m) \quad (3)$$

where $U_n$ denotes the left SVD matrix of the MIMO channel $H_n$ of an $n^{th}$ SDMA user, when the MIMO channel $H_n$ is decomposed by SVD, and $W_m$ denotes the SDMA weight matrix of the $m^{th}$ SDMA user.

As noted from Equation (3), the $m^{th}$ SDMA user perceives data weighted with the SDMA weight values of the other users as 0.

Therefore, the received signal of each SDMA user is given by Equation (4).

$$y_m = \tilde{U}_m^H U_m^H(1:L_m)H_m \sum_{i=1}^{K} W_i \tilde{V}_i(1:L_i)x_i + n_m \quad (4)$$

where $U_m$ denotes the left SVD matrix of the MIMO channel $H_m$ of the $m^{th}$ SDMA user, when the MIMO channel $H_m$ is decomposed by SVD, and A(1: L) denotes a submatrix of matrix A, formed by $1^{st}$ to $L^{th}$ columns of matrix A, i.e. the number of transmission streams for a user using matrix A. $\tilde{U}_m$ and $\tilde{V}_m$ denote the left and right SVD matrices of $\tilde{U}_m^H U_m^H(1:L_m)H_m W_m$, respectively when $\tilde{U}_m^H U_m^H(1:L_m)H_m W_m$ is decomposed by SVD. $W_m \tilde{V}_m(1:L_m)$ describes the SVD operation (pre-processing) performed in BS 100, and $\tilde{U}_m^H U_m^H(1:L_m)$ describes the SVD operation (post-processing) performed at each SDMA user, i.e. each SDMA receiver.

In view of the nature of the SDMA weight values expressed as Equation (3), Equation (4) is given as Equation (5).

$$y_m = \tilde{U}_m^H U_m^H(1:L_m)H_m W_m \tilde{V}_m(1:L_m)x_m + \quad (5)$$

$$\tilde{U}_m^H U_m^H(1:L_m)H_m \sum_{i=1, j \neq m}^{K} W_i \tilde{V}_i(1:L_i)x_i + n_m$$

$$= R_m^H H_m T_m x_m + n_m$$

where $R_m$ is $\tilde{U}_m^H U_m^H(1:L_m)$ describing the SVD operation (post-processing) performed at each SDMA user and $T_m$ is $W_m \tilde{V}_m(1:L_m)$ describing the SVD operation (pre-processing) performed in BS 100.

Equation (5) reveals that each of the K SDMA users can recover his/her data without interference from the other SDMA users.

Figure 2:
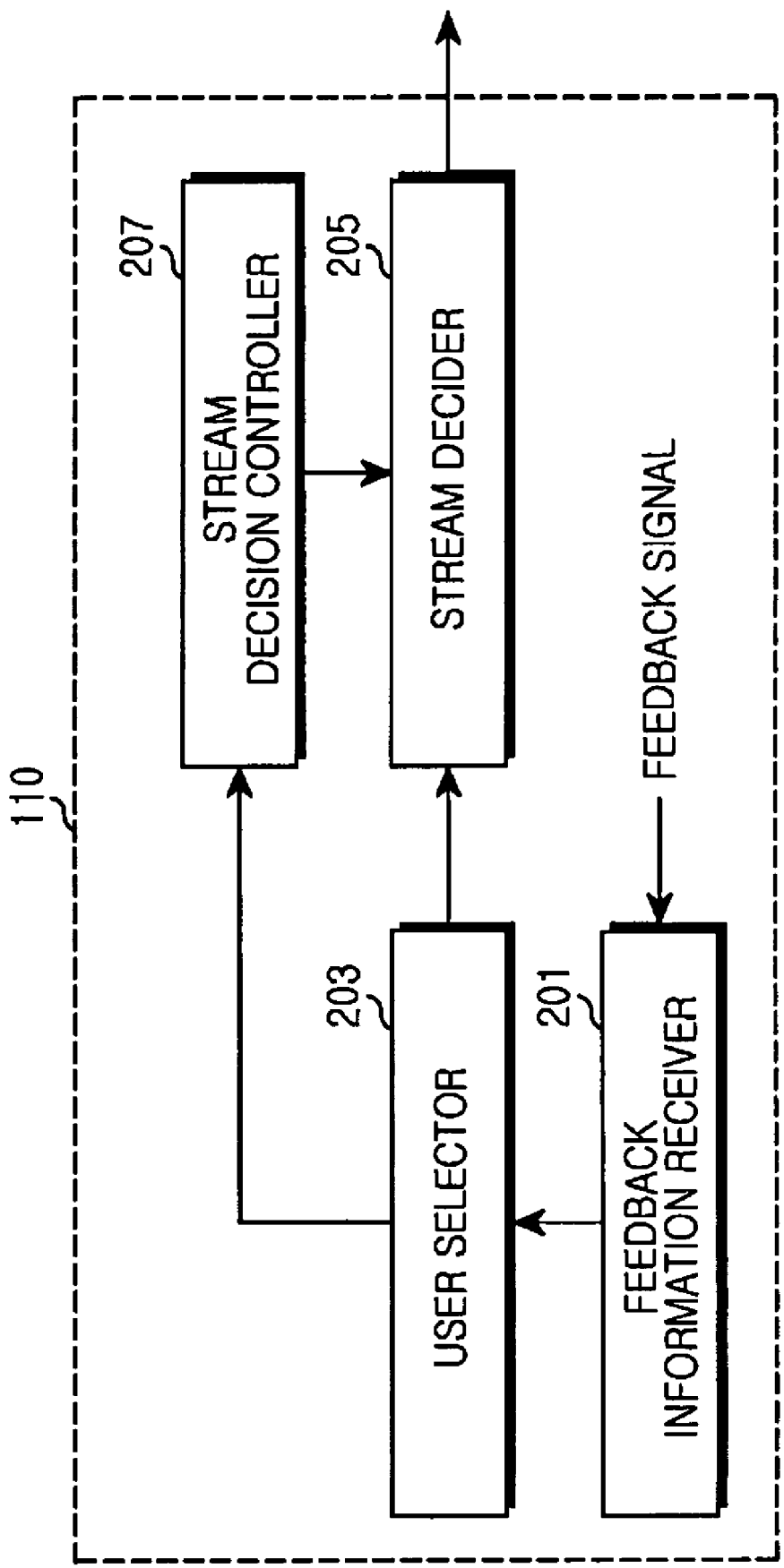
FIG. 2 is a detailed block diagram of an apparatus for selecting SDMA users and determining the number of transmission streams for allocation to each of the SDMA users in the multi-user multi-antenna system according to the present invention.

Referring to FIG. 2, transmission controller 110 includes a feedback information receiver 201, a user selector 203, a stream decider 205, and a stream decision controller 207.

Feedback information receiver 201 acquires the average Signal-to-Interference and Noise Ratio (SINR) of each user from feedback channel information received from the user.

One thing to note is that feedback information receiver 201 receives channel information from all users irrespective of selected SDMA users and unselected users. Alternatively, feedback information receiver 201 may receive feedback SINR information from all the users.

User selector 203 arranges the users in a descending order of the SINRs received from feedback information receiver 201, selects a user with the highest SINR and users with SINRs that are lower than the highest SINR by a predetermined threshold or less, and groups the selected users as SDMA users. While user selector 203 groups the SDMA users based on the SINRs, the user grouping can be carried out based on channel capacities, average eigenvalues, maximal eigenvalues, or the like.

Stream decider 205 determines the number of transmission streams for each of the SDMA users of the user group by a tree search under the control of stream decision controller 207. More specifically, stream decider 205 calculates the total number of transmission streams available to the user group and generates all possible stream number combinations for the SDMA users of the user group. Then stream decider 205 selects a stream number combination having the largest transmission capacity by a tree search over every possible stream number combination. The tree search can be done in a T-D method or a B-U method, in which the possible stream number combinations are sequentially applied to the selected users and then the best stream number combination is selected.

In the T-D tree search, under the control of stream decision controller 207, stream decider 205 initially allocates an allowed maximum number of streams to each of the SDMA users in the user group and then calculates the transmission capacity, while decreasing the number of streams allocated to the SDMA users by 1 at each time. Then, stream decider 205 selects a stream number combination with the largest transmission capacity.

In the B-U tree search, under the control of stream decision controller 207, stream decider 205 initially calculates the transmission capacity without allocating any transmission streams to the SDMA users, and then calculates it, while increasing the number of transmission streams for the SDMA users by one at each time. Finally, stream decider 205 selects a stream number combination with the largest transmission capacity.

Stream decision controller 207 selects a stream decision method (e.g. the T-D or B-U tree search) according to the number of the users in the user group, for example, by Equation (6).

$$\begin{cases} W \leq \lceil \alpha N_T / N_R \rceil & \text{Top} - \text{Down} \\ W > \lceil \alpha N_T / N_R \rceil & \text{Bottom} - \text{Up} \end{cases} \quad (6)$$

where W denotes the number of the SDMA users in the user group, $N_T$ denotes the number of the transmit antennas in the BS, and $N_R$ denotes the number of receive antennas per user. Hence, $N_T/N_R$ denotes the ratio of the number of the transmit antennas in the BS to that of the receive antennas per user. If each user has a different number of receive antennas, $N_R$ is one of the average, minimum, or maximum of the numbers of receive antennas in the SDMA users of the user group.

$\lceil A \rceil$ represents rounding up, rounding, or rounding off and $\alpha$ denotes a coefficient that controls the precedences of the stream decision methods. For example, as $\alpha$ increases, the precedence of the T-D approach increases. If $\alpha$ is set to one, there is no precedence between two approaches.

As shown in Equation (6), when the number of the SDMA users in the user group is less than or equal to $\lceil \alpha N_T/N_R \rceil$, stream decision controller 207 selects the T-D tree search. If the number of the SDMA users in the user group is larger than $\lceil \alpha N_T/N_R \rceil$, stream decision controller 207 selects the B-U tree search.

In the above embodiment of the present invention, stream decision controller 207 compares the number of the SDMA users in the user group with the ratio of the number of the transmit antennas to that of the receive antennas per user in deciding a stream decision method. It may be further contemplated that stream decision controller 207 takes into account a criterion other than the ratio of the number of the transmit antennas to that of the receive antennas per user in making a decision as to a stream decision method.

Further, stream decider 205 may select two candidate stream number combinations using both the T-D and B-U approaches and select a stream number combination with the higher expected performance.

Now a description will be made of a method for selecting SDMA users and determining the number of transmission streams for each of the SDMA users in the multi-user MIMO system having the configuration illustrated in FIG. 1, particularly in transmission controller 110 of BS 100.

Figure 3:
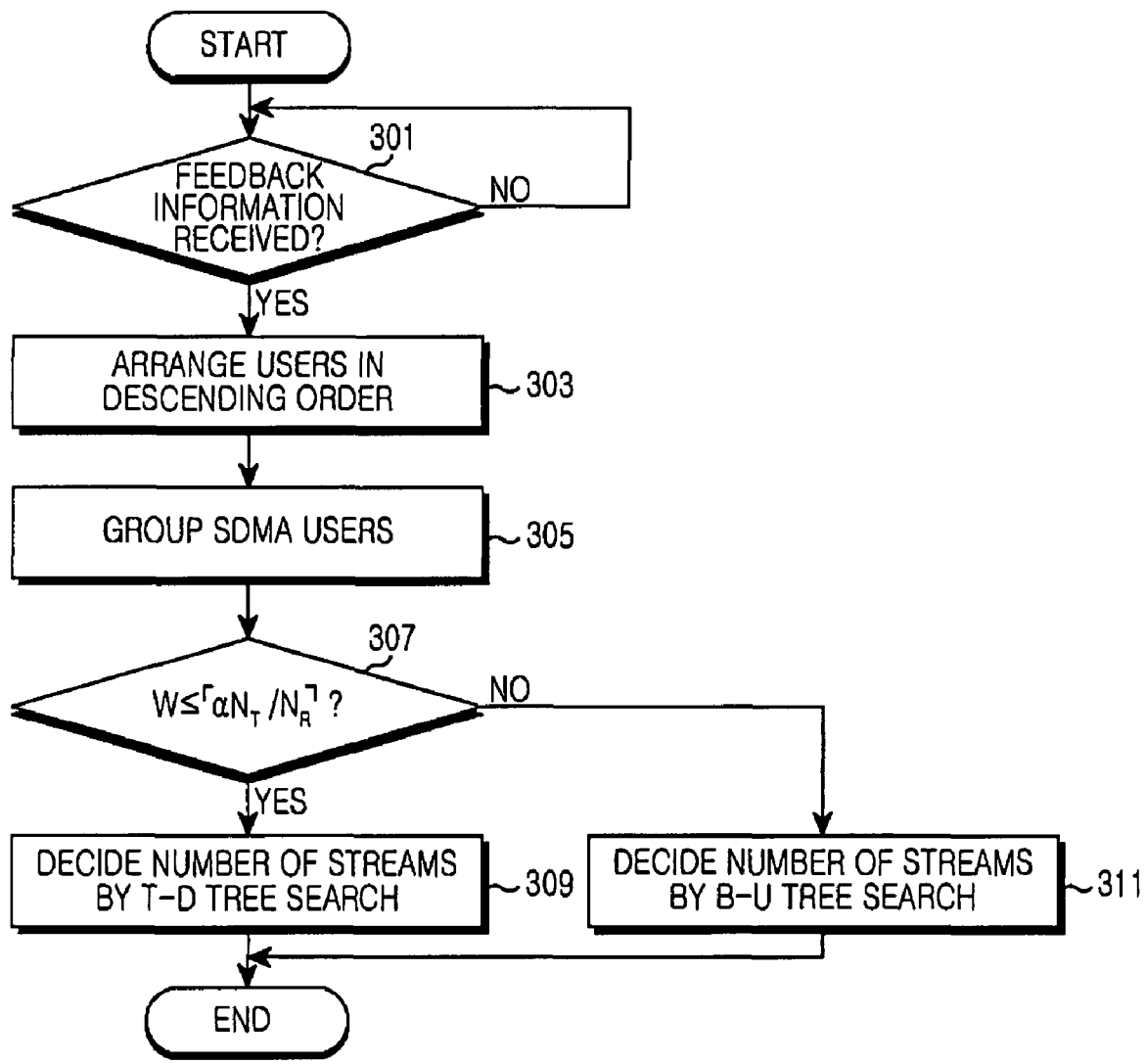
FIG. 3 is a flowchart of an operation for selecting SDMA users and determining the number of transmission streams for allocation to each of the SDMA users in the multi-user multi-antenna system according to the present invention.

Referring to FIG. 3, transmission controller 110 monitors reception of feedback information from all users in step 301. Upon receipt of the feedback information, transmission controller 110 acquires downlink channel information from the feedback information. If the MIMO system operates in TDD, transmission controller 110 can estimate downlink channels of the users using uplink signals received from them.

In step 303, transmission controller 110 acquires the average SINR of each user in the downlink channel information about the user and arranges the users in a descending order of the average SINRs. While transmission controller 110 selects users using their SINRs, it may use channel capacities, Carrier-to-Interference Ratio (CNR), average eigenvalues, maximum eigenvalues, or the like, instead.

Transmission controller 110 selects a user with the highest average SINR and users with average SINRs lower than the highest average SINR by a predetermined threshold or less and groups them in step 305.

In step 307, transmission controller 110 determines a tree search-based stream decision method according to the number W of the users of the user group, the number $N_T$ of transmit antennas in the BS, and the number $N_R$ of receive antennas per user in order to decide the number of transmission streams for each of the SDMA users. Specifically, transmission controller 110 compares the number of the SDMA users in the user group with the ratio of the number of the transmit antennas of the BS to that of the receive antennas per user ($\lceil \alpha N_T/N_R \rceil$) and determines a tree search-based stream decision method to decide the number of transmission streams for each of the SDMA users.

If W is less than or equal to $\lceil \alpha N_T/N_R \rceil$ (W$\leq \lceil \alpha N_T/N_R \rceil$), transmission controller 110 determines the number of transmission streams to be allocated to each of the SDMA users by the T-D approach in step 309. For example, transmission controller 110 allocates an allowed maximum number of transmission streams to each of the SDMA users in the user group and then selects a stream number combination with the highest transmission capacity, while decreasing the number of streams allocated to the SDMA users by 1 at each time. For selecting an optimal stream number combination, SINR, Carrier-to-Interference Ratio (CNR), Bit Error Rate (BER), pairwise error probability transmission rate or the like can be used instead of the transmission capacity. Then, transmission controller 110 ends the algorithm.

On the other hand, if W is larger than $\lceil \alpha N_T/N_R \rceil$ (W>$\lceil \alpha N_T/N_R \rceil$), transmission controller 110 determines the number of transmission streams to be allocated to each of the SDMA users by the B-U approach in step 311. For example, transmission controller 110 initially allocates no streams to the SDMA users of the user group and then calculates the transmission capacity, while increasing the number of transmission streams for the SDMA users by 1 at each time. Transmission controller 110 then determines a stream number combination that maximizes the transmission capacity. For selecting an optimal stream number combination, SINR, BER, pairwise error probability or the like can be used instead of the transmission capacity. Then, transmission controller 110 ends the algorithm.

Transmission controller 110 compares the number W of the SDMA users in the user group with the ratio $\lceil \alpha N_T/N_R \rceil$ of the number of the transmit antennas to that of the receive antennas per user in deciding a tree search-based stream decision method. It may be further contemplated that stream decision controller 207 takes into account a criterion other than the ratio of the number of the transmit antennas to that of the receive antennas per user in making a decision as to a stream decision method. Also, transmission controller 110 may perform a tree search using one of the T-D or B-U method without comparing W with $\lceil \alpha N_T/N_R \rceil$. Further, transmission controller 110 may select two candidate stream number combinations using both the T-D and B-U approaches and select a stream number combination with the higher expected performance.

As described above, the multi-user MIMO system selects SDMA users from among total users according to their SINRs and determines a stream decision method according to the number of the SDMA users. How the number of transmission streams to be allocated to each of the SDMA users is determined will be described in great detail with reference to FIGS. 4, 5 and 6.

Figure 4:
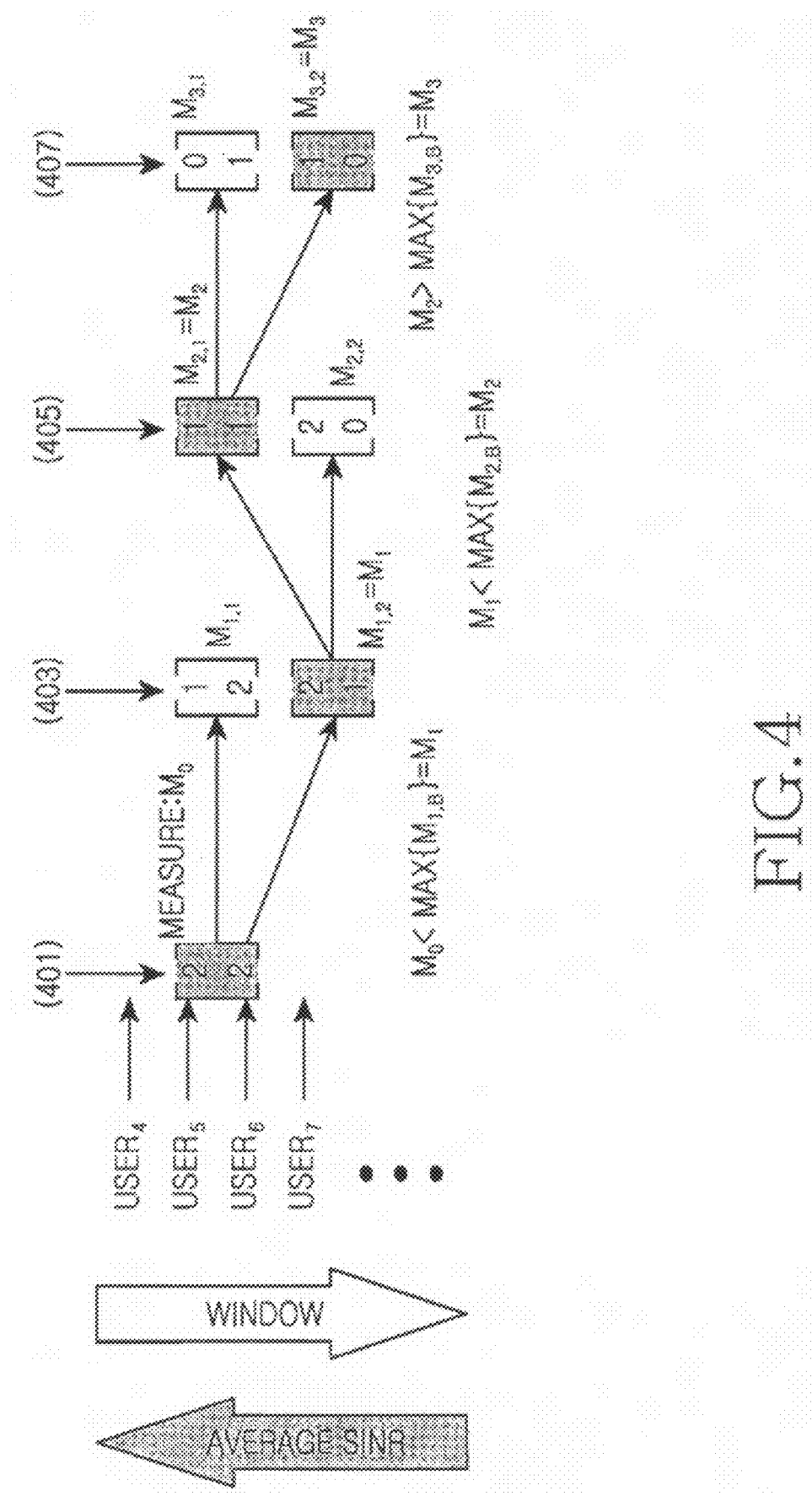
FIG. 4 illustrates a Top-Down (T-D) tree search according to the present invention.

Referring to FIG. 4, the BS has four transmit antennas and each user has two receive antennas. If α is 1, two users in good channel states (i.e. high SINRs), user$_5$ and user$_6$ are selected.

Since two SDMA users are selected and the ratio $\lceil \alpha N_T/N_R \rceil$ of the number of the transmit antennas to that of the receive antennas per user is 2, the T-D approach is taken.

Hence, stream decider 205 allocates an allowed maximum number of transmission streams to each of the selected SDMA users and measures the transmission capacity $M_0$ in step 401. For the four transmit antennas and the two users, a maximum of two transmission streams can be allocated to each SDMA user, that is, the stream number combination is (2, 2).

Then stream decider 205 measures the transmission capacities $M_1$ of all possible stream number combinations formed by decreasing the number of streams for the SDMA users by 1 and selects the highest of the transmission capacities $M_1$.

In step 403, stream decider 205 compares the selected $M_1$ with $M_0$. For instance, stream decider 205 compares the transmission capacity $M_{1,1}$ when allocating one transmission stream to user$_5$ and two transmission streams to user$_6$ with the transmission capacity $M_{1,2}$ when allocating two transmission streams to user$_5$ and one transmission stream to user$_6$ and selects the higher transmission capacity, herein $M_{1,2}$. Then stream decider 205 compares $M_{1,2}$ with $M_0$.

If the selected $M_1$ is less than or equal to $M_0$ ($M_1 \leq M_0$), stream decider 205 selects the stream number combination with $M_0$ for allocation to the SDMA users.

If the selected $M_1$ is larger than $M_0$ ($M_1 > M_0$), stream decider 205 measures the transmission capacities $M_2$, for example, $M_{2,1}$ and $M_{2,2}$ of all possible stream number combinations formed by decreasing the number of streams for the SDMA users by 1 and selects the highest of the transmission capacities $M_2$ in step 405.

In this way, stream decider 205 detects a stream number combination with the highest transmission capacity, while decreasing the numbers of transmission streams for the selected SDMA users in the T-D method.

Figure 5:
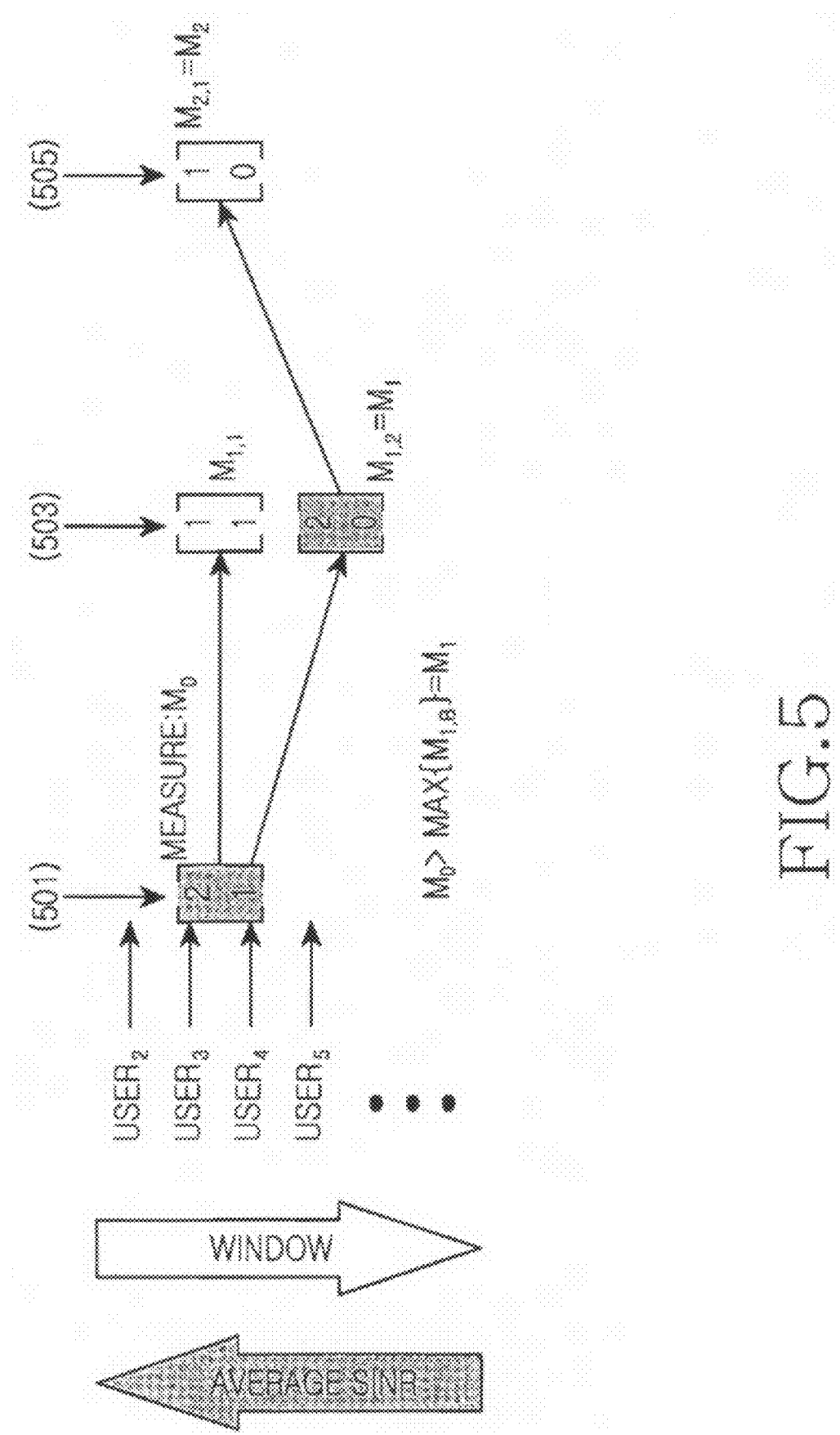
FIG. 5 illustrates another T-D tree search according to the present invention.

Referring to FIG. 5, the BS has three transmit antennas and each user has two receive antennas. If α is 1, two users in good channel states (i.e. high SINRs), user 3 and user 4 are selected.

Since two SDMA users are selected and the ratio $\lceil \alpha N_T/N_R \rceil$ of the number of the transmit antennas to that of the receive antennas per user is 2, the T-D approach is taken. Stream decider 205 determines the number of transmission streams for each of the selected SDMA users in the same manner as illustrated in FIG. 4 and thus a description of the T-D search will not be provided herein.

As described above, when the MIMO system determines the number of transmission streams for each of SDMA users by the T-D tree search, it initially allocates an allowed maximum number of transmission streams to each of the SDMA users under the constraint that the total number of transmission streams allocated to the SDMA users is equal to or less than the number of transmit antennas. If the number of transmit antennas is less than the total number of transmission streams allocated to the SDMA users, the MIMO system selects a stream number combination with the highest performance (e.g. highest transmission capacity) from among stream number combinations each having the sum of stream number elements equal to the number of transmit antennas and initially allocates transmission streams corresponding to the selected stream number combination to the SDMA users. For instance, when a maximum of two transmission streams can be allocated to each of user 3 and user 4 in the illustrated case of FIG. 5, for three transmit antennas, the MIMO system can initially allocate (2, 1) transmission streams or (1, 2) transmission streams to user 3 and user 4 and selects a stream number combination with the higher performance (e.g. higher transmission capacity) between (2, 1) and (1, 2), for initial stream allocation.

Figure 6:
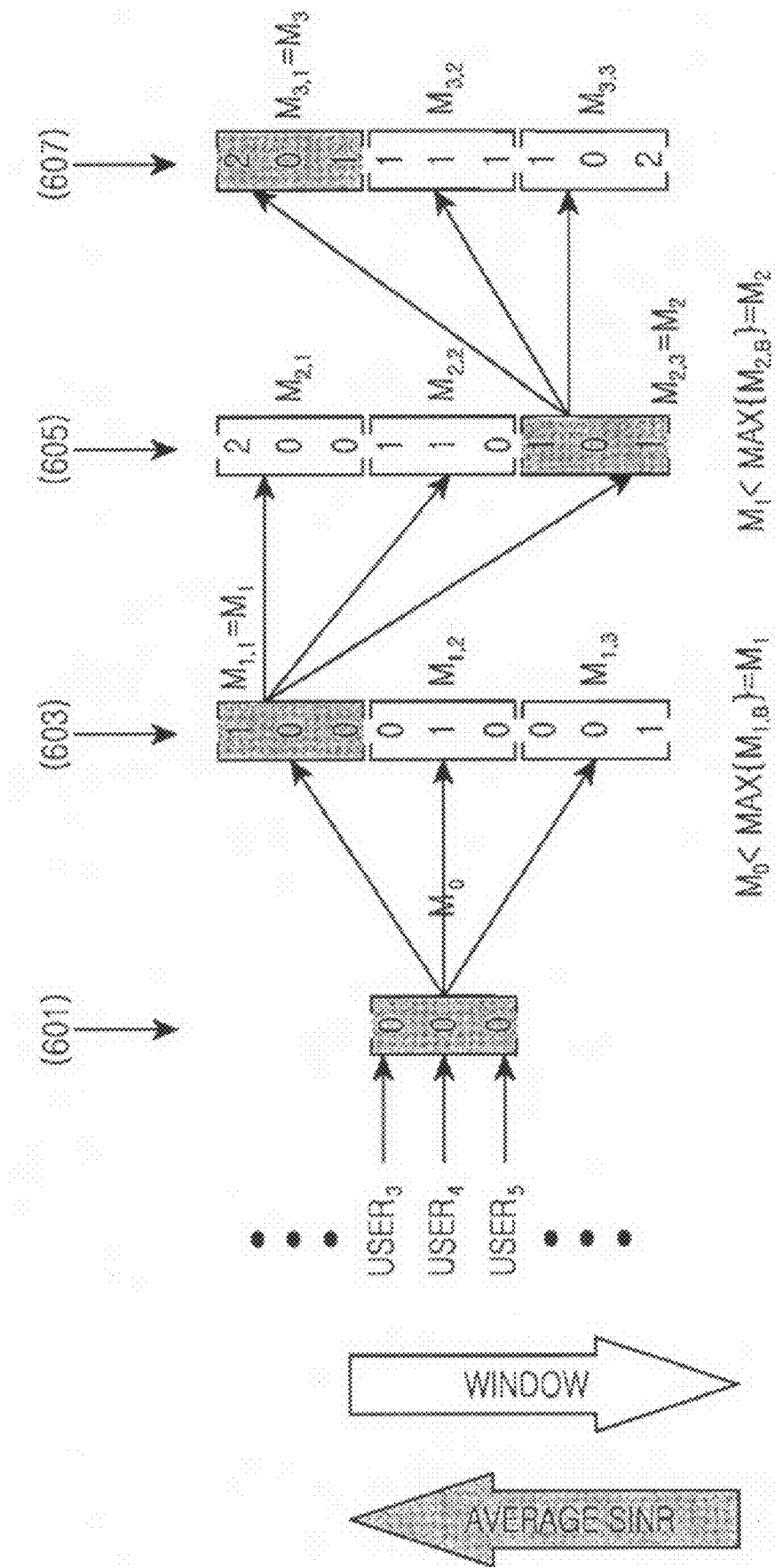
FIG. 6 illustrates a Bottom-Up (B-U) tree search according to the present invention.

Referring to FIG. 6, the BS has three transmit antennas and each user has two receive antennas. If α is 1, three users in good channel states (i.e. high SINRs), user$_3$, user$_4$ and user$_5$ are selected.

Since three SDMA users are selected and the ratio $\lceil \alpha N_T/N_R \rceil$ of the number of the transmit antennas to that of the receive antennas per user is 2, the B-U approach is taken.

Hence, stream decider 205 measures the transmission capacity $M_0$ without allocating any transmission streams to the SDMA users in step 601.

Then stream decider 205 measures the transmission capacities $M_1$ of all possible stream number combinations formed by increasing the number of transmission streams for the total SDMA users by 1 and selects the highest of the transmission capacities $M_1$.

In step 603, stream decider 205 compares the selected $M_1$ with $M_0$. For instance, since stream decider 205 allocates one transmission stream to the total SDMA users, it measures the transmission capacities of all cases with one transmission stream, for example, (1, 0, 0), (0, 1, 0), and (0, 0, 1). Then stream decider 205 compares the selected $M_1$ with $M_0$.

If the selected $M_1$ is less than or equal to $M_0$ ($M_1 \leq M_0$), stream decider 205 selects the stream number combination with $M_0$ for allocation to the SDMA users. That is, stream decider 205 allocates no transmission streams to the SDMA users.

If the selected $M_1$ is larger than $M_0$ ($M_1 > M_0$), stream decider 205 measures the transmission capacities $M_2$ of all possible stream number combinations formed by increasing the number of streams for the total SDMA users by 1, selects the highest of the transmission capacities $M_2$, and compares the selected $M_2$ with the selected $M_1$ in step 605.

In this way, stream decider 205 detects a stream number combination with the highest transmission capacity, while increasing the total number of transmission streams for the selected SDMA users in the B-U method.

As described above, the multi-user MIMO system increases the transmission capacity by selecting SDMA users and determining the number of transmission streams for allocation to each of the SDMA users. Since the MIMO system selects a stream number combination that maximizes the transmission capacity after selecting the SDMA users according to their average SINRs, it reduces complexity. That is, the SDMA user selection and the determination of a stream number combination with maximal transmission capacity increase the channel capacity and reduce the complexity, as illustrated in FIGS. 7A to 10B. Herein below, the term "exhaustive search" means a search scheme in which optimal SDMA users and is selected and the optimal number of transmission streams is determined for each SDMA user by searching all user combinations and all stream number combinations. The term "Time Division Multiple Access (TDMA)" refers to a communication scheme that divides time and selects a user in the best channel state in each time period, for communications.

Figure 7A:
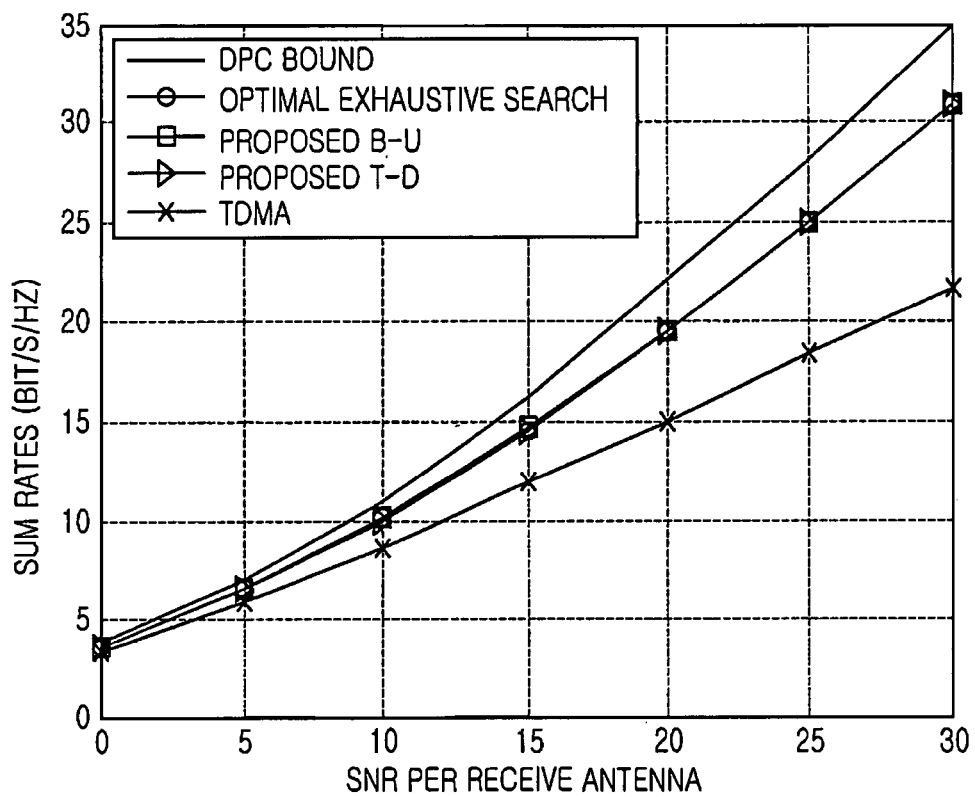
FIGS. 7A and 7B are graphs comparing the T-D tree search and the B-U tree search according to the present invention with exhaustive search in terms of performance, for four transmit antennas, two receive antennas per user, and two selected SDMA users.
Figure 7B:
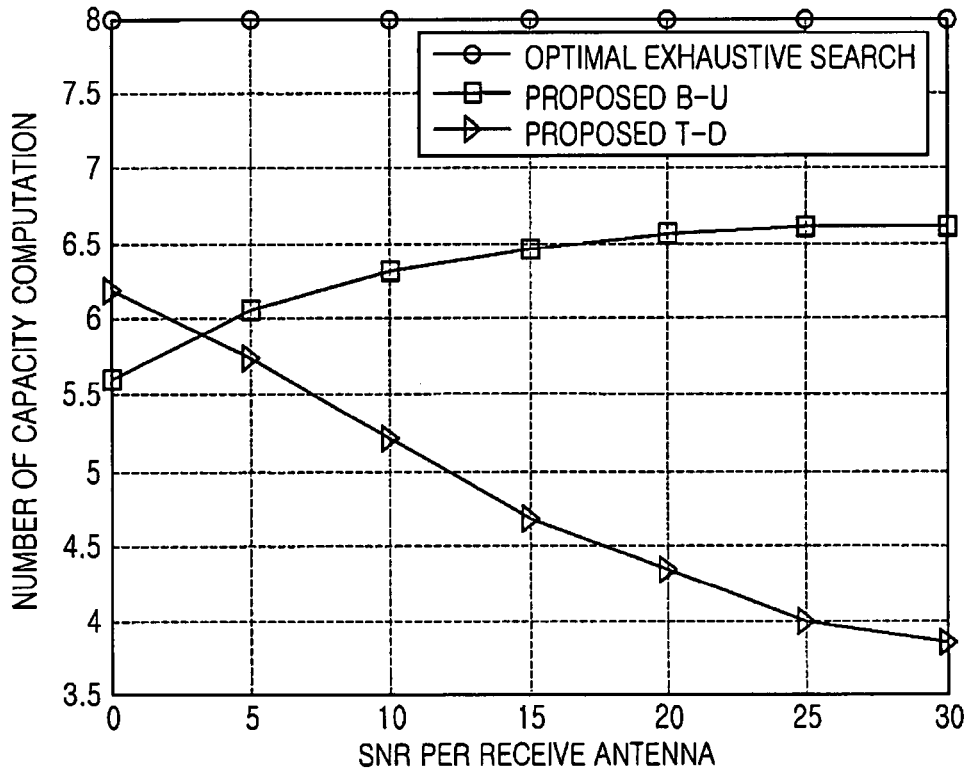

FIGS. 7A and 7B are graphs comparing the T-D tree search and the B-U tree search according to the present invention with exhaustive search in terms of performance, for four transmit antennas, two receive antennas per user, and two selected SDMA users with an SINR difference of 0 dB.

Specifically, FIG. 7A is a graph illustrating transmission capacity versus Signal-to-Noise Ratio (SNR) per receive antenna and FIG. 7B is a graph illustrating complexity change versus SNR per receive antenna. In FIG. 7A, the horizontal axis represents SNR per receive antenna and the vertical axis represents transmission capacity. The horizontal axis represents SNR per receive antenna and the vertical axis represents the number of capacity computations in FIG. 7B.

Referring to FIG. 7A, the transmission capacities of the T-D and B-U tree searches according to the present invention approach that of the exhaustive search.

Referring to FIG. 7B, for SDMA implementation, the T-D and B-U tree searches according to the present invention reduce the number of capacity computations, compared to the exhaustive search. That is, the tree searches of the present invention have less complexity than the exhaustive search, as shown in Table 1 below.

TABLE 1

| | SNR | | | | | | |
|---|---|---|---|---|---|---|---|
| | 0 dB | 5 dB | 10 dB | 15 dB | 20 dB | 25 dB | 30 dB |
| Exhaustive search | 8 | 8 | 8 | 8 | 8 | 8 | 8 |
| B-U search | 5.5 | 6.0 | 6.3 | 6.4 | 6.5 | 6.5 | 6.6 |
| T-D search | 6.1 | 5.6 | 5.2 | 4.6 | 4.3 | 4.0 | 3.8 |

TABLE 1-continued

| | SNR | | | | | | |
|---|---|---|---|---|---|---|---|
| | 0 dB | 5 dB | 10 dB | 15 dB | 20 dB | 25 dB | 30 dB |

Table 1 shows that because the number of selected SDMA users is equal to the ratio of the number of the transmit antennas to that of the receive antennas per user, $\lceil \alpha N_T / N_R \rceil$, the T-D search is less complex than the B-U search at or above an SNR of 5 dB.

Figure 8A:
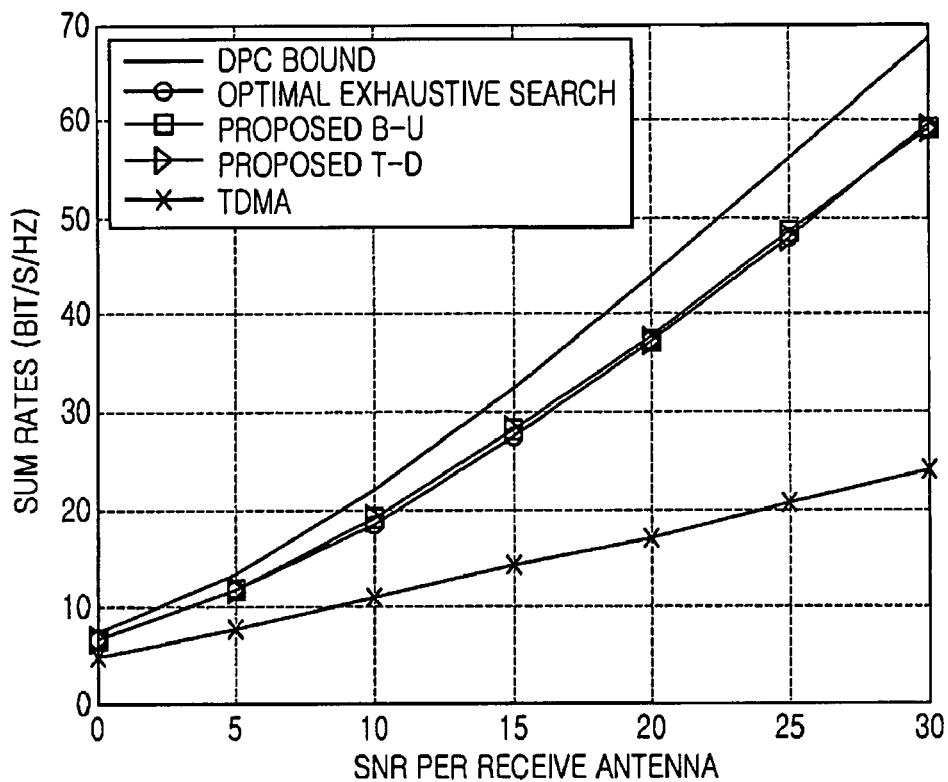
FIGS. 8A and 8B are graphs comparing the T-D tree search and the B-U tree search according to the present invention with the exhaustive search in terms of performance, for eight transmit antennas, two receive antennas per user, and four selected SDMA users.
Figure 8B:
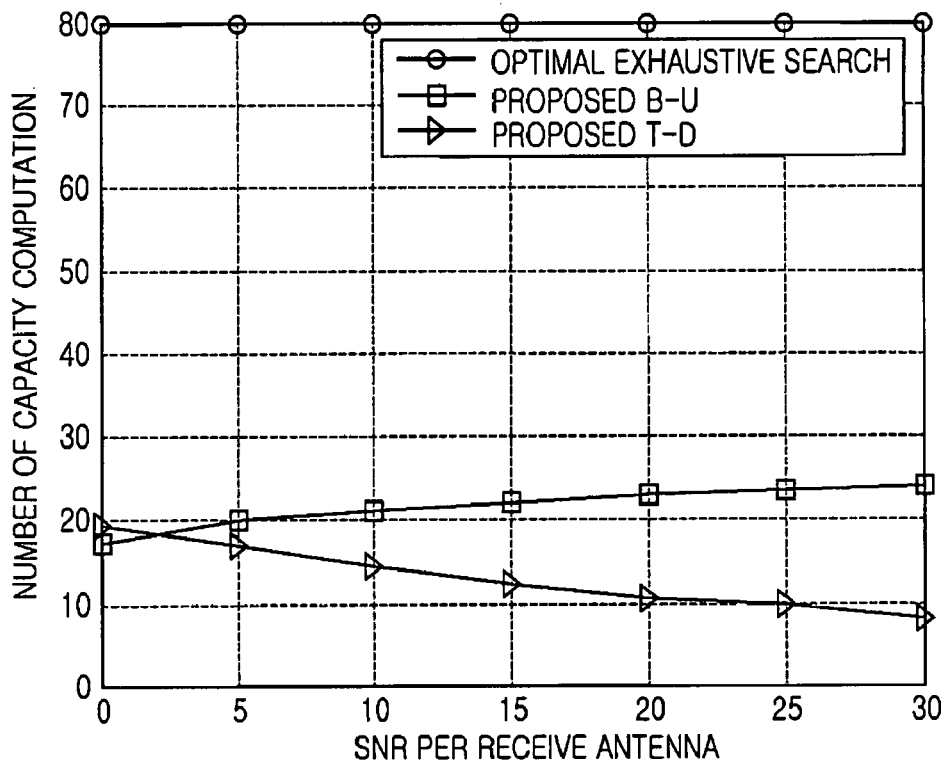

FIGS. 8A and 8B are graphs comparing the T-D tree search and the B-U tree search according to the present invention with the exhaustive search in terms of performance, for eight transmit antennas, two receive antennas per user, and four selected SDMA users under the same simulation conditions of FIGS. 7A and 7B.

Specifically, FIG. 8A is a graph illustrating transmission capacity versus SNR per receive antenna and FIG. 8B is a graph illustrating number of capacity computations versus SNR per receive antenna.

Referring to FIG. 8A, the transmission capacities of the tree searches according to the present invention approach that of the exhaustive search.

Referring to FIG. 8B, for SDMA implementation, the tree searches according to the present invention are far less complex than the exhaustive search, as shown in Table 2 below.

TABLE 2

| | SNR | | | | | | |
|---|---|---|---|---|---|---|---|
| | 0 dB | 5 dB | 10 dB | 15 dB | 20 dB | 25 dB | 30 dB |
| Exhaustive search | 80 | 80 | 80 | 80 | 80 | 80 | 80 |
| B-U search | 17.4 | 19.7 | 21.4 | 22.4 | 23.0 | 23.2 | 23.5 |
| T-D search | 19.5 | 17.2 | 14.5 | 12.5 | 10.9 | 9.8 | 8.8 |

Table 2 reveals that the T-D search is about 10 times less complex than the B-U search at or above an SNR of 30 dB.

Figure 9A:
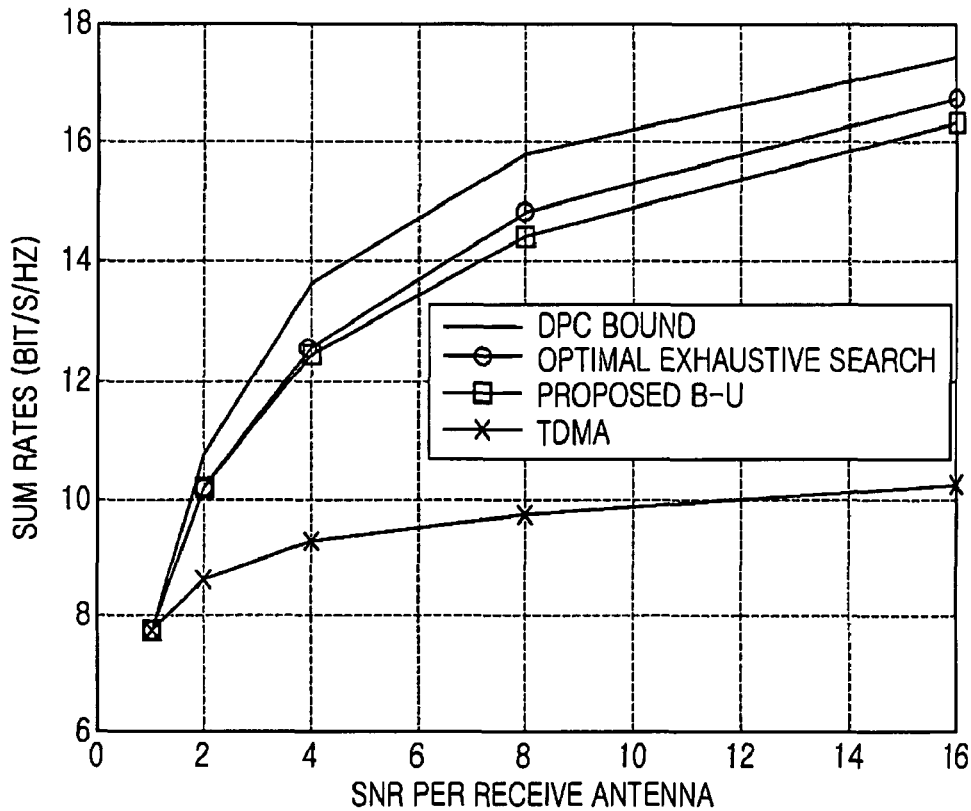
FIGS. 9A and 9B are graphs comparing the T-D tree search and the B-U tree search according to the present invention with the exhaustive search in terms of performance with respect to a varying number of SDMA users, for four transmit antennas and two receive antennas per user.
Figure 9B:
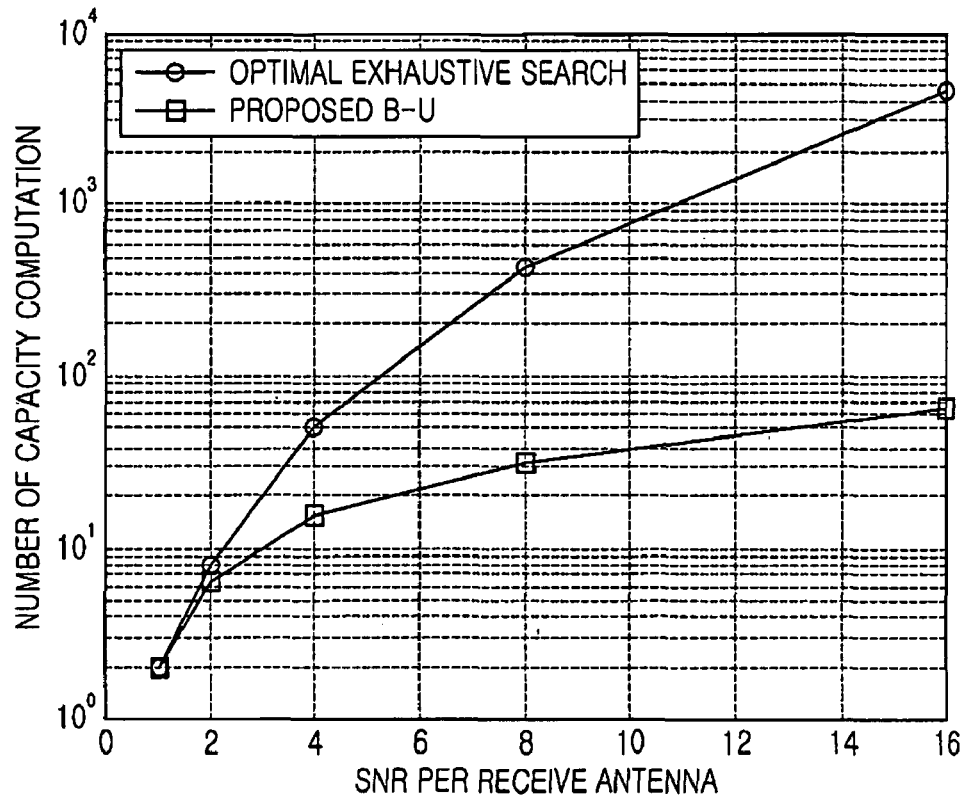

FIGS. 9A and 9B are graphs comparing the T-D tree search and the B-U tree search according to the present invention with the exhaustive search in terms of performance with respect to a varying number of SDMA users, for four transmit antennas and two receive antennas per user. The selected SDMA users have an SINR difference of 0 dB.

When the number of SDMA users increases for a given SNR of 10 dB, the performance changes as illustrated in FIGS. 9A and 9B. Specifically, FIG. 9A is a graph illustrating transmission capacity versus number of SDMA users and FIG. 9B is a graph illustrating number of capacity computations versus number of SDMA users. In FIG. 9A, the horizontal axis represents number of SDMA users and the vertical axis represents transmission capacity. The horizontal axis represents number of SDMA users and the vertical axis represents the number of capacity computations in FIG. 9B.

Referring to FIG. 9A, despite the increase of SDMA users in number, the transmission capacity of the present invention approaches that of the exhaustive search.

Referring to FIG. 9B, as more SDMA users are serviced, the present invention is less complex than the exhaustive search, as shown in Table 3 below.

TABLE 3

| | Number of Users | | | | |
|---|---|---|---|---|---|
| | 1 | 2 | 4 | 8 | 16 |
| Exhaustive search | 2 | 8 | 49 | 422 | 4572 |
| B-U search | 2 | 6.3 | 15.2 | 31.7 | 63.9 |
| TDMA | 1 | 2 | 4 | 8 | 16 |

Table 3 shows that for 16 SDMA users, the present invention is 70 times less complex than the exhaustive search.

Figure 10A:
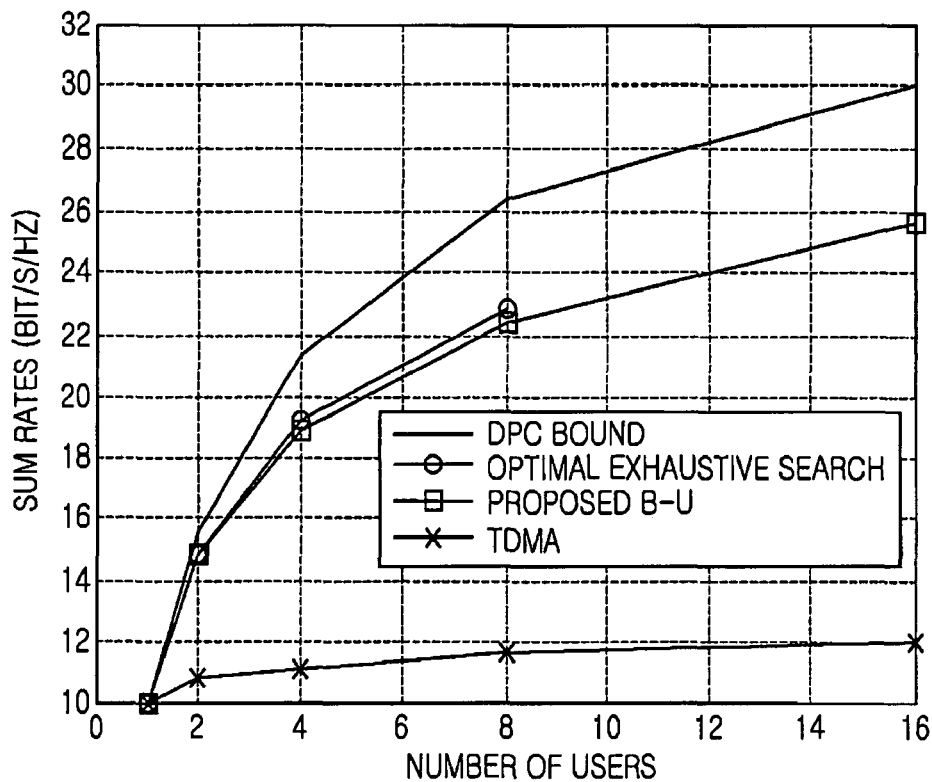
FIGS. 10A and 10B are graphs comparing the T-D tree search and the B-U tree search according to the present invention with the exhaustive search in terms of performance with respect to a varying number of SDMA users, for eight transmit antennas and two receive antennas per user.
Figure 10B:
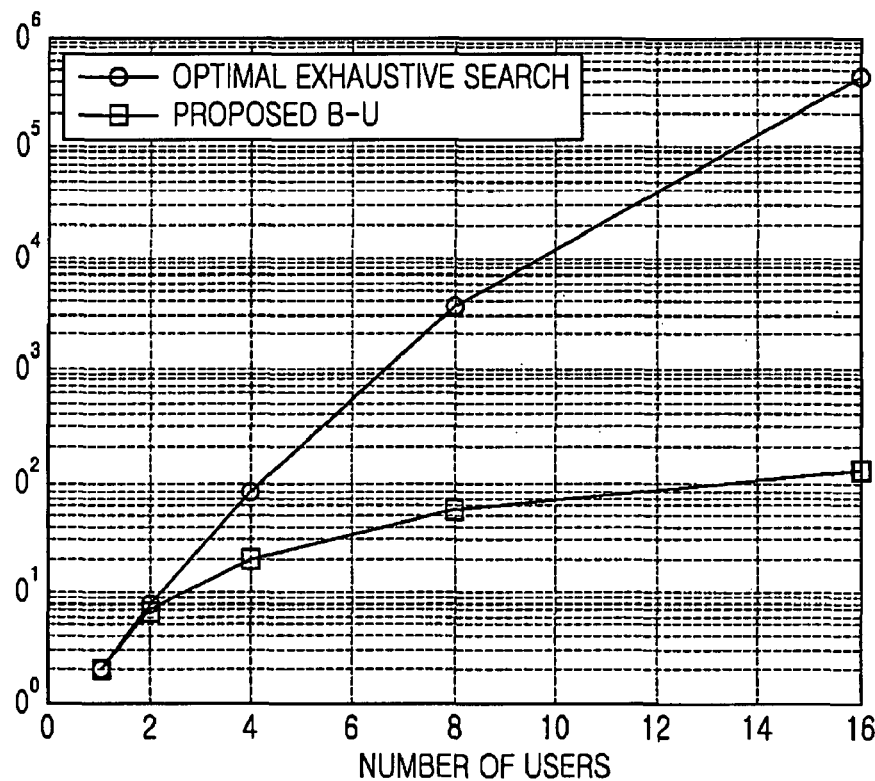

FIGS. 10A and 10B are graphs comparing the T-D tree search and the B-U tree search according to the present invention with the exhaustive search in terms of performance with respect to a varying number of SDMA users, for eight transmit antennas and two receive antennas per user.

Under the same simulation conditions as those of the simulation illustrated in FIGS. 9A and 9B, the number of SDMA users is increased with respect to eight transmit antennas. As noted from FIG. 10A, the channel capacity of the present invention approaches that of exhaustive search, that is, the present invention performs almost as well as the exhaustive search. FIG. 10B demonstrates that the present invention is far less complex than the exhaustive search, as shown in Table 4 below.

TABLE 4

| | Number of Users | | | | |
|---|---|---|---|---|---|
| | 1 | 2 | 4 | 8 | 16 |
| Exhaustive search | 2 | 8 | 80 | 3777 | 423878 |
| B-U search | 2 | 6.6 | 21.5 | 55.4 | 124.2 |
| TDMA | 1 | 2 | 4 | 8 | 16 |

Table 4 shows that for 8 SDMA users, the present invention is 70 times less complex than the exhaustive search. As more transmit antennas are used, compared to the case illustrated in FIGS. 9A and 9B, the present invention suffers from a less complexity increase rate than the exhaustive search.

As is apparent from the above description, the present invention increases system capacity and reduces complexity because it implements SDMA by selecting SDMA users and determining the number of transmission streams for each of the SDMA users according to channel environment in a multi-user multi-antenna system.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A method for implementing Spatial Division Multiple Access (SDMA) in a multi-user multi-antenna system, comprising:
   selecting SDMA users from among total users according to channel state information of the total users; and
   determining the number of transmission streams to be allocated to each of the SDMA users by a tree search method,
   wherein the determination comprises selecting a tree search method for determining the number of transmission streams for each SDMA user, and determining the number of transmission streams for each SDMA user by the selected tree search method.

2. The method of claim 1, further comprising calculating an SDMA weight value and a Singular Value Decomposition (SVD) weight value for the each SDMA user, after the determination.

3. The method of claim 1, wherein the channel state information is one of a Signal-to-Interference and Noise Ratio (SINK), Carrier-to-Interference Ratio (CNR), a channel capacity, an average Eigenvalue, and a maximal Eigenvalue.

4. The method of claim 1, wherein the selection comprises:
   arranging the total users according to channel states of the total users; and
   selecting a user in the best channel state and users in channel states poorer than the best channel state by a predetermined threshold or less, as the SDMA users.

5. The method of claim 1, wherein the determination comprises:
   generating all possible stream number combinations according to the number of the SDMA users and the number of transmission streams available to the each SDMA user in order to perform the tree search; and
   selecting a stream number combination that offers the best channel state by sequentially assigning the stream number combinations to the SDMA users.

6. The method of claim 5, wherein the channel state is assessed by one of capacity, data rate, SINR, Carrier-to-Interference Ratio (CNR), pairwise error probability, transmission rate, and Bit Error Rate (BER).

7. The method of claim 1, wherein the tree search method selection comprises:
   comparing the number of the SDMA users with a predetermined threshold; and
   selecting a first tree search method, if the number of the SDMA users is equal to or less than the predetermined threshold.

8. The method of claim 7, wherein the predetermined threshold is a ratio between the number of transmit antennas in a transmitter and the number of receive antennas per receiver.

9. The method of claim 7, wherein the first tree search method is a tree search scheme that initially allocates an allowed maximum number of transmission streams to the SDMA users and detects a stream number combination offering the best channel state, while decreasing the number of allocated transmission streams by 1 at each time.

10. The method of claim 7, wherein the tree search method selection further comprises selecting a second tree search method, if the number of the SDMA users is larger than the predetermined threshold.

11. The method of claim 10, wherein the second tree search method is a tree search scheme that initially allocates no transmission streams to the SDMA users and then detects a stream number combination offering the best channel state, while increasing the number of allocated transmission streams by 1 at each time.

12. The method of claim 1, wherein the tree search method selection comprises selecting a tree search method according to $$\begin{cases} W \leq \lceil \alpha N_T / N_R \rceil & \text{Top–Down} \\ W > \lceil \alpha N_T / N_R \rceil & \text{Bottom–Up} \end{cases}$$

where W denotes the number of the SDMA users, $N_T$ denotes the number of transmit antennas in a transmitter, $N_R$ denotes the number of receive antennas per user, $N_T/N_R$ denotes the ratio of the number of the transmit antennas to the number of the receive antennas per user. If each user has a different number of receive antennas, and a denotes a coefficient for controlling the precedences of tree search methods.

13. The method of claim 1, further comprising:
determining the number of transmission streams for the each SDMA user by a first tree search method;
determining the number of transmission streams for the each SDMA user by a second tree search method;
comparing a channel state offered by the number of transmission streams determined by the first tree search method with a channel state offered by the number of transmission streams determined by the second tree search method; and
selecting the number of transmission streams offering a better channel state.

14. A transmitter in a multi-user multi-antenna system, comprising:
a user selector for selecting Spatial Division Multiple Access (SDMA) users from among total users according to channel state information of the total users;
a stream decider for determining the number of transmission streams to be allocated to each of the SDMA users by a tree search method; and
a controller for selecting a tree search method for determining the number of transmission streams for each SDMA user by comparing the number of SDMA users with a predetermined threshold,
wherein the stream decider determines the number of transmission streams for each SDMA user by a first tree search method, if the number of the SDMA users is equal to or less than the predetermined threshold and determines the number of transmission streams for each SDMA user by a second tree search method, if the number of SDMA users is larger than the predetermined threshold.

15. The transmitter of claim 14, further comprising a feedback receiver for receiving and checking channel state information received from the total users.

16. The transmitter of claim 14, wherein the channel state information is one of a Signal-to-Interference and Noise Ratio (SINR), Carrier-to-Interference Ratio (CNR), a channel capacity, an average Eigenvalue, and a maximal Eigenvalue.

17. The transmitter of claim 14, wherein the user selector arranges the total users according to channel states of the total users, and selects a user in the best channel state and users in channel states poorer than the best channel state by a predetermined threshold or less, as the SDMA users.

18. The transmitter of claim 14, wherein the stream decider generates all possible stream number combinations according to the number of the SDMA users and the number of transmission streams available to the each SDMA user in order to perform the tree search, and selects a stream number combination that offers the best channel state by sequentially assigning the stream number combinations to the SDMA users.

19. The transmitter of claim 18, wherein the channel state is assessed by one of capacity, data rate, SINR, Carrier-to-Interference Ratio (CNR), pairwise error probability, transmission rate and Bit Error Rate (BER).

20. The transmitter of claim 14, wherein the predetermined threshold is a ratio between the number of transmit antennas in a transmitter and the number of receive antennas per receiver.

21. The transmitter of claim 14, wherein the first tree search method is a tree search scheme that initially allocates an allowed maximum number of transmission streams to the SDMA users and detects a stream number combination offering the best channel state, while decreasing the number of allocated transmission streams by 1 at each time.

22. The transmitter of claim 14, wherein the second tree search method is a tree search scheme that initially allocates no transmission streams to the SDMA users and then detects a stream number combination offering the best channel state, while increasing the number of allocated transmission streams by 1 at each time.

23. The transmitter of claim 14, wherein the controller selects a tree search method according to $$\begin{cases} W \le \lceil \alpha N_T/N_R \rceil & \text{Top} - \text{Down} \\ W > \lceil \alpha N_T/N_R \rceil & \text{Bottom} - \text{Up} \end{cases}$$

where W denotes the number of the SDMA users, $N_T$ denotes the number of transmit antennas in a transmitter, $N_R$ denotes the number of receive antennas per user, $N_T/N_R$ denotes the ratio of the number of the transmit antennas to the number of the receive antennas per user, If each user has a different number of receive antennas, and a denotes a coefficient for controlling the precedences of tree search methods.

24. The transmitter of claim 14, wherein the stream decider determines the number of transmission streams for the each SDMA user by a first tree search method,
determines the number of transmission streams for the each SDMA user by a second tree search method,
compares a channel state offered by the number of transmission streams determined by the first tree search method with a channel state offered by the number of transmission streams determined by the second tree search method, and selects the number of transmission streams offering a better channel state.

* * * * *